UNITED STATES PATENT OFFICE.

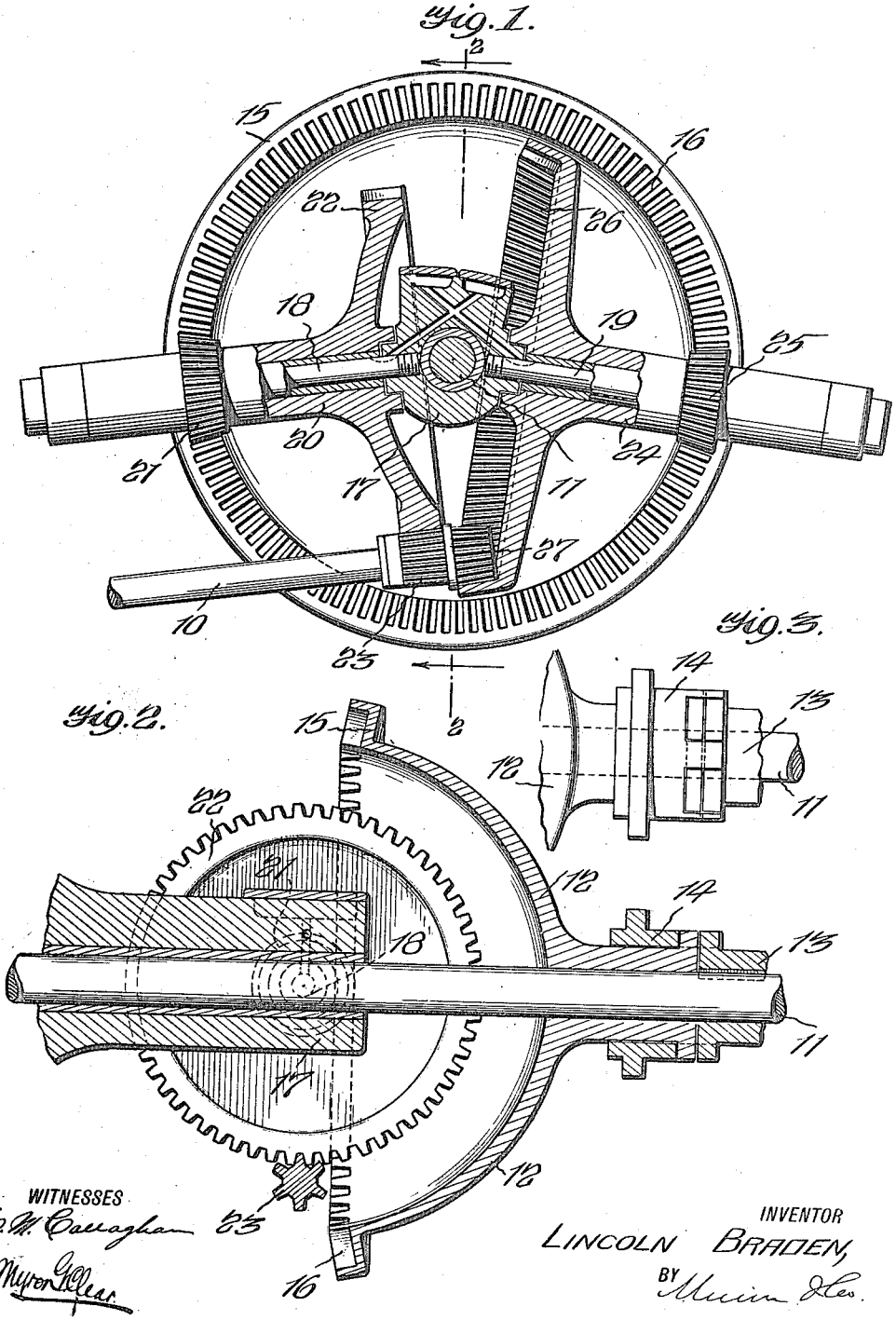

LINCOLN BRADEN, OF CARBON, CALIFORNIA.

TRANSMISSION-GEARING FOR MOWING-MACHINES.

1,226,454. Specification of Letters Patent. Patented May 15, 1917.

Application filed June 28, 1916. Serial No. 106,349.

*To all whom it may concern:*

Be it known that I, LINCOLN BRADEN, a citizen of the United States, and a resident of Carbon, in the county of Shasta and State of California, have invented a certain new and useful Improvement in Transmission-Gearing for Mowing-Machines, of which the following is a specification.

My present invention relates particularly to mowing machine gearing, and aims to provide a novel transmission of a simple effective nature, for the purposes, and to the advantages, to be presently described in detail.

Among the objects of my present invention I aim to provide a transmission gearing for mowing machines, in which there are two driving connections with the pitman shaft, these driving connections engaging opposite sides of the shaft so that their thrust is in opposite directions, the thrust of one counterbalancing the thrust of the other, so as to eliminate, so far as is possible, in this way, the friction in the bearings of the driven end of the pitman shafts.

My invention further aims to provide a transmission gearing for mowing machines, the construction of which permits the pitman shaft to be placed in a position more nearly approximating the horizontal than is possible with the transmission gearings now in use, and to thus do away with the greater part of what is known as "wringing" motion of the pitman common to all machines in which the rear end of the pitman shaft is of necessity much higher than the crank or forward end.

A further object is to accomplish this latter advantage without sacrificing either the standardized clearance below the main shaft or axle of the machine, or the standardized length of the pitman shaft itself.

Still further, my invention aims to provide a transmission gearing for mowing machines whose special construction will avoid the lifting of the left hand side of the main frame of the machine, and the throwing of additional weight upon the shaft of the master gear, such as takes place in all machines where a single pinion is used in connection with the master gear and is located to the rear of the main shaft or axle of the machine, and likewise to avoid the tendency of the master gear to climb up on the main frame of the machine, adding to the weight of the main frame, such as takes place where a single pinion is utilized and is located in front of the main shaft or axle of the machine.

With these objects in mind, the particular construction I utilize may be better understood and more thoroughly appreciated from the following description thereof, reference being made to the accompanying drawings forming a part of this specification, and wherein—

Figure 1 is a view partly in elevation and partly in section illustrating the several parts of my improved transmission gearing.

Fig. 2 is a vertical sectional view taken substantially on line 2—2 of Fig. 1, and Fig. 3 is a detail elevation of the clutch of the master pinion.

Referring now to these figures, in which the pitman shaft is clearly seen at 10 in Fig. 1, and the main shaft or axle of the machine is clearly seen at 11 in Figs. 1 and 2, I provide the latter with a semiglobular master gear 12, loose upon the shaft adjacent a rigid sleeve 13, to which the master gear 12 is connected by a sliding clutch member 14, the open end of the gear 12 having a surrounding flange 15 upon which a gear ring 16 is formed.

Upon the main shaft or axle 11 adjacent the open end of the master gear 12, is disposed a bearing member 17, in which are secured the inner ends of outwardly projecting stub shafts 18 and 19, each having bearings adjacent its outer end in a portion of the main frame of the machine in connection with which the transmission gearing is utilized, and each being inclined slightly as particularly seen in Fig. 1.

Rotatable upon the shaft 18 is a sleeve 20 having at its outer end a bevel pinion 21, rotated at a point intermediate the ends of the shaft 18, and in engagement with the gear ring 16 of the master gear at one side of the vertical plane of the main shaft 11, the inner end of the sleeve 20 being provided with an enlarged gear 22 rotated immediately beyond one side of the main shaft 11, in the present instance its forward side, and engaging a gear 23 secured upon the pitman shaft 10 adjacent the rear upper end of the latter.

Likewise rotatable upon the shaft 19 is a sleeve 24 having at its outer end a bevel pinion 25 located intermediate the ends of the shaft 19, and in engagement with one side of the gear ring 16 of the master pinion, upon the relatively opposite side of the vertical plane of the main shaft 11, as compared to the pinion 21 before mentioned, the inner end of the sleeve 24 having an enlarged internal gear 26, the diameter of which is sufficiently greater than the diameter of the gear 22 opposed thereto, to receive a bevel gear 27 located and secured upon the upper extremity of the pitman shaft 10, beyond the gear 23 of the latter.

Thus, the gears 22 and 26 engage the gears of the pitman shaft at points diametrically opposite one another with respect to the pitman shaft whereby the opposing thrusts counterbalance one another and enable the upper portion of the pitman shaft to rotate in its journals (not shown), with minimum friction.

It is furthermore obvious that, by locating the master gear upon the main shaft or axle, with the two driving connections to the pitman shaft, which engage the master gear at points upon relatively opposite sides of the vertical plane of the main shaft or axle 11, lifting of the left hand side of the main frame of the machine and climbing of the master gear are both avoided, due to the counterbalancing of the effective actions of the master pinion.

A further advantage in the use of two intermediate driving members, both of which contribute to the transmission of rotation to the pitman shaft, lies in the fact that, dividing the frame as they do, I am enabled to use shafting for their support which is much smaller than common, reducing friction in the bearings.

I claim:—

1. In mowing machine gearing, the combination with a main shaft or axle, and the pitman shaft, of a master gear carried by the main shaft, a pair of transmission gears in connection with the pitman shaft and engaging the master gear at points upon relatively opposite sides of the vertical plane of the main shaft.

2. In mowing machine gearing, the combination with the main shaft or axle, and the pitman shaft, of a master gear carried by the main shaft, and a pair of intermediate gears engaging the said master gear at opposite sides of the vertical plane of its axis, each of which gears is in connection with the pitman shaft.

3. In mowing machine gearing, the combination with the main shaft or axle, and the pitman shaft, of a master gear carried by the main shaft, a pair of gear members carried by the pitman shaft, and intermediate transmission gears including a pair of gears engaging the master gear at points upon relatively opposite sides of the vertical plane of its axis, each of which latter gears is in engagement with one of the gears of the pitman shaft.

4. In mowing machine gearing, the combination with the main shaft or axle, and the pitman shaft, of a master gear carried by the main shaft, a pair of gear members carried by the pitman shaft, intermediate transmission gears including a pair of gears engaging the master gear at points upon relatively opposite sides of the vertical plane of its axis, and gear members rigid with the said gears engaging the master wheel, said last named gears engaging the gears of the pitman shaft.

5. In mowing machine gearing, the combination with the main shaft or axle, and the pitman shaft, of a pair of gears carried by the said pitman shaft, and connections between the said gears and the main shaft, including gears engaging the said pitman shaft gears at points diametrically opposite one another.

6. In mowing machine gearing, the combination with the main shaft or axle, and the pitman shaft, of transmission gears therebetween, including gear members engaging the pitman shaft at diametrically opposed points, whereby to counterbalance the thrust thereagainst.

7. In mowing machine gearing, the combination with the main shaft or axle, and the pitman shaft, of a master gear carried by the main shaft, a pair of intermediate shafts, a pair of gear members carried by each of said shafts, one of each pair being in engagement with the master gear, and a pair of gears carried by the pitman shaft and with which the other gears of the intermediate shafts engage.

8. In mowing machine gearing, the combination with the main shaft or axle, and the pitman shaft, of a pair of gears carried by the pitman shaft, a master gear carried by the main shaft or axle, a pair of intermediate shafts, a pair of gears carried by each of said intermediate shafts and each pair including an outer beveled gear engaging the master gear at one side thereof, and an inner gear, the inner gear of one of said intermediate shafts engaging one of the gears of the pitman shaft, and the inner gear of the other intermediate shaft being in the form of an internally geared ring engaging the other gear of the pitman shaft at a point diametrically opposed with respect to the point of engagement of the first named inner gear.

LINCOLN BRADEN.

Copies of this patent may be obtained for five cents each, by addressing the "Commissioner of Patents, Washington, D. C."